(12) United States Patent
Ijtsma et al.

(10) Patent No.: US 7,965,596 B2
(45) Date of Patent: Jun. 21, 2011

(54) DEFECT MANAGEMENT FOR REAL-TIME INFORMATION

(75) Inventors: Pope Ijtsma, Eindhoven (NL); Johannis Friso Rendert Blacquiere, Eindhoven (NL); Dirk Hamelinck, Beerzel (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1165 days.

(21) Appl. No.: 11/570,513

(22) PCT Filed: Jun. 14, 2005

(86) PCT No.: PCT/IB2005/051958
§ 371 (c)(1),
(2), (4) Date: Dec. 13, 2006

(87) PCT Pub. No.: WO2006/000947
PCT Pub. Date: Jan. 5, 2006

(65) Prior Publication Data
US 2007/0217295 A1   Sep. 20, 2007

(30) Foreign Application Priority Data

Jun. 21, 2004  (EP) .................................... 04102836

(51) Int. Cl.
*G11B 7/00*   (2006.01)
(52) U.S. Cl. ................ 369/47.13; 369/53.17; 369/47.32
(58) Field of Classification Search .......................... None
See application file for complete search history.

(56) References Cited

U.S. PATENT DOCUMENTS

| | | | |
|---|---|---|---|
| 4,638,472 A | 1/1987 | Ogata et al. | |
| 5,258,852 A | 11/1993 | Kamijima | |
| 6,101,619 A | 8/2000 | Shin | |
| 6,189,110 B1 | 2/2001 | Saitoh et al. | |
| 6,272,085 B1 | 8/2001 | Maeda | |
| 6,414,923 B1 | 7/2002 | Park et al. | |

FOREIGN PATENT DOCUMENTS

| | | |
|---|---|---|
| EP | 1383128 A2 | 1/2004 |
| JP | 2000076785 A | 3/2000 |
| JP | 2000322840 A | 11/2000 |

(Continued)

OTHER PUBLICATIONS

NCITS: Information Technology—SCSI Multimedia Commands—3 (MMC3) Online, Nov. 2001, Revision 10, URL: http://www.t10.org./ftp/t10/drafts/mmc3/mmc3r10g.> XP002344330.

(Continued)

*Primary Examiner* — Jorge L Ortiz Criado (57) ABSTRACT

A device for recording records blocks of information on logical addresses on a record carrier at corresponding physical addresses. The logical addresses are translated into the physical addresses in dependence on defect management information that includes defect information on a defective status of physical addresses and remapping information on translating a logical address initially mapped to an initial physical address to an alternate physical address. The device has a real-time storage unit for writing real-time information blocks (77) to respective initial physical addresses irrespective of the defective status. When recording at a defective status location (76), the real-time information block is temporarily stored in a memory (80). In a separate period, when the writing of real-time information blocks is suspended, said temporarily stored real-time information blocks are additionally written to alternate physical addresses (81). The defect management information (73) is updated to indicate that the real-time information block is present at both locations.

7 Claims, 5 Drawing Sheets

FOREIGN PATENT DOCUMENTS

| | | |
|---|---|---|
| JP | 2004039228 A | 2/2004 |
| WO | 9816014 A1 | 4/1998 |
| WO | 0106512 A1 | 1/2001 |
| WO | 03063164 A2 | 7/2003 |
| WO | 2004036572 A1 | 4/2004 |
| WO | 2005008660 A1 | 1/2005 |

OTHER PUBLICATIONS

Written Opinion of the International Searching Authority PCT/IB2005/051958.

DEFECT MANAGEMENT FOR REAL-TIME INFORMATION

The invention relates to a device for recording information in blocks having logical addresses on a record carrier, which device comprises recording means for recording marks in a track on the record carrier representing the information.

The invention further relates to a device for reading information in blocks having logical addresses on a record carrier, which device comprises reading means for reading marks in a track on a record carrier representing the information.

The invention further relates to a method of real-time information defect management for use in recording information.

The invention further relates to a computer program product for real-time information defect management for use in recording information.

The invention relates to the field of information storage, and therein to defect management for real-time information.

A device and method for recording information on a record carrier and real-time information defect management are known from WO01/06512. The document relates to optical record carriers such as CD or DVD. Optical recording devices have recording means for recording the information in information blocks having logical addresses on a disc at corresponding allocated physical addresses. The document describes writing real-time information like video signals on an optical disc having an administrative area, a spare area, and a user area. Normal recording takes place in real-time information blocks in a first free part of the user area. If during the recording process a defective block is encountered a replacement recording having the size of a plurality of blocks is made in a pre-reserved area of the user area, after which normal recording continues in the first free part. The process of writing data blocks at an alternate location is commonly called defect management. Defect management information is created and maintained indicating the defective physical addresses and the replacements made.

A problem of recording real-time information is that the requirements for speed and performance of the recording device may be high. Subsequently, the known defect management method will degrade the performance due to the need for replacement recording at alternate physical addresses.

It is an object of the invention to provide a system of real-time information defect management that facilitates storing real-time information while maintaining a high real-time performance.

For this purpose, the device for recording as described in the opening paragraph comprises control means for controlling the recording by locating each block at a physical address in the track, the control means comprising addressing means for translating the logical addresses into the physical addresses and vice versa in dependence on defect management information, defect management means for managing the defect management information, the defect management information comprising defect information on a defective status of physical addresses and remapping information on translating a logical address initially mapped to an initial physical address to an alternate physical address, and real-time storage means for writing real-time information blocks to respective initial physical addresses irrespective of the defective status, and temporarily storing, in a memory, at least one real-time information block that has been written on a physical address having the defective status, and, in a separate period when the writing of real-time information blocks is suspended, additionally writing said temporarily stored real-time information block to the alternate physical address, and updating the defect management information to indicate that the real-time information block is present at the initial physical address having the defective status and at the alternate physical address.

For this purpose, the device for reading as described in the opening paragraph comprises control means for controlling the reading by locating each block at a physical address in the track, the control means comprising addressing means for translating the logical addresses into the physical addresses and vice versa in dependence on defect management information, the defect management information comprising defect information on a defective status of physical addresses and remapping information on translating a logical address initially mapped to an initial physical address to an alternate physical address, and real-time retrieval means for, when real-time constraints do not allow suspending reading real-time information, reading the real-time information blocks from the respective initial physical addresses irrespective of the defect management information, and, in a separate period when real-time constraints allow suspending reading real-time information, reading at least one alternate real-time information block from an alternate address according to the defect management information indicating that the real-time information block is present at the initial physical address having the defective status and at the alternate physical address, and outputting the alternate real-time information block instead of information from the initial physical address having the defective status.

For this purpose, the method of real-time information defect management as described in the opening paragraph is for use in recording information in blocks having logical addresses, which recording comprises translating the logical addresses into the physical addresses and vice versa in dependence on defect management information, managing the defect management information, the defect management information comprising defect information on a defective status of physical addresses and remapping information on translating a logical address initially mapped to an initial physical address to an alternate physical address, which method comprises writing real-time information blocks to respective initial physical addresses irrespective of the defective status, and temporarily storing at least one real-time information block that has been written on a physical address having the defective status, and, in a separate period when the writing of real-time information blocks is suspended, additionally writing said temporarily stored real-time information block to the alternate physical address, and updating the defect management information to indicate that the real-time information block is present at the initial physical address having the defective status and at the alternate physical address.

The measures have the effect that the real-time information blocks are consecutively recorded in physical addresses according to the initial allocation of logical addresses to physical addresses. This has the advantage that the original high performance of the device is not degraded due to interruptions for writing replacement blocks. In addition, at a later time when the writing of real-time information blocks is suspended, e.g. due to sufficient real-time data space being available in buffers or no pending writing request, the real-time information blocks that have been recorded at locations the defective status are recorded again in a spare alternate location. Note that this may include locations at which a defect has been actually detected during the last writing action, and that may need remapping to a spare area for the first time. The defect management information is updated to a specific state indicating that such block are present at both the original and the alternate location. This advantageously allows the reading device to read the original location only if there is time pressure due to real-time constraints, and therefore maintain a high speed real-time performance. If no time pressure is present, e.g. when copying a real-time file, the real-time information blocks are read from the alternate locations and advantageously subsequent error levels are low.

The invention is also based on the following recognition. The inventors have seen that for real-time information recording it may be considered to overrule any defect management, and just record data on the original locations. However, such a policy would result in high error levels whenever the recording is read. Furthermore, defect management systems are known that substantially prevent errors from occurring by remapping data blocks from defective physical addresses, or when a defect is detected during writing, to alternate locations. However, such a policy substantially reduces the performance of a system for real-time information recording, and particularly also during reading, because the data always has to be retrieved from the remapped locations. In particular the inventors have seen that writing data on the original physical address that already has a defective status, i.e. recording physical addresses explicitly marked defective, still has the advantage that in many cases the data still is retrievable from there, although with a possibly increased error level. Hence, by additionally writing such data blocks to alternate locations when time allows, and updating the defect management information to indicate the special dual recorded status, the data may always be retrieved with low error levels by faster reading devices or when no real-time constraints are present, e.g. during copying or slow motion replay.

In an embodiment of the recording device the real-time storage means are arranged for detecting real-time information from received write commands. The device detects the type of information to be recorded from the type of the write commands or the sequence, e.g. at high speed regularly occurring write commands for consecutive address ranges. This has the advantage that the recording device autonomously applies the real-time information defect management when a host starts real-time information recording.

In an embodiment of the recording device the real-time storage means are arranged for additionally writing said temporarily stored real-time information blocks when substantially no memory space is available for storing further real-time information blocks. This has the advantage that only if substantially all available memory space has been used, the writing of real-time information will be interrupted by the device. Note that when the host interrupts the real-time information recording, the additional writing may be started also.

Further preferred embodiments of the device and method according to the invention are given in the appended claims, disclosure of which is incorporated herein by reference.

These and other aspects of the invention will be apparent from and elucidated further with reference to the embodiments described by way of example in the following description and with reference to the accompanying drawings, in which FIG. 6 shows real-time information defect management.

Corresponding elements in different Figures have identical reference numerals.

Figure 1A:
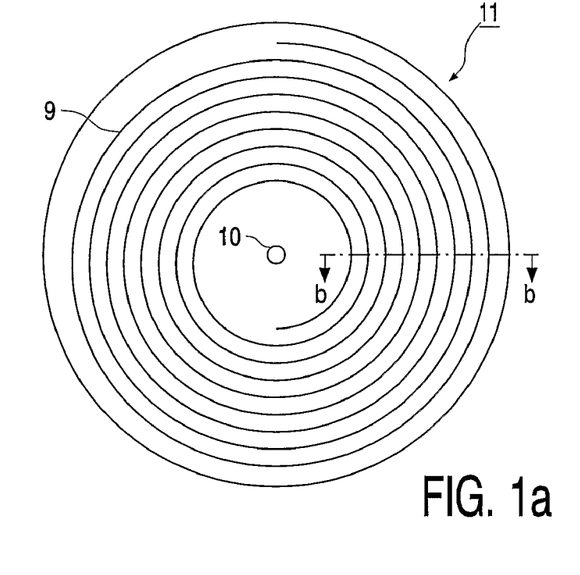
FIG. 1*a* shows a record carrier (top view)

FIG. 1*a* shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-RW, and rewritable versions of DVD, such as DVD+RW, and the high density writable optical disc using blue lasers, called Blu-ray Disc (BD). Further details about the DVD disc can be found in reference: *ECMA*-267: *120 mm DVD-Read-Only Disc*- (1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 in FIG. 1*b* which enables a read/write head to follow the track during scanning. The track structure comprises position information including so-called physical addresses, for indicating the location of units of information, usually called information blocks. The position information includes specific synchronizing marks for locating the start of such information blocks.

Figure 1B:
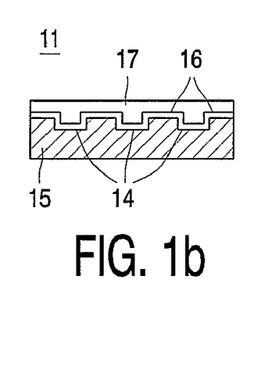
FIG. 1*b* shows a record carrier (cross section)

FIG. 1*b* is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying digital information in blocks under control of a file management system. The information may include real-time information to be recorded and reproduced continuously, in particular information representing digitally encoded video according to a standardized format like MPEG2.

Figure 2:
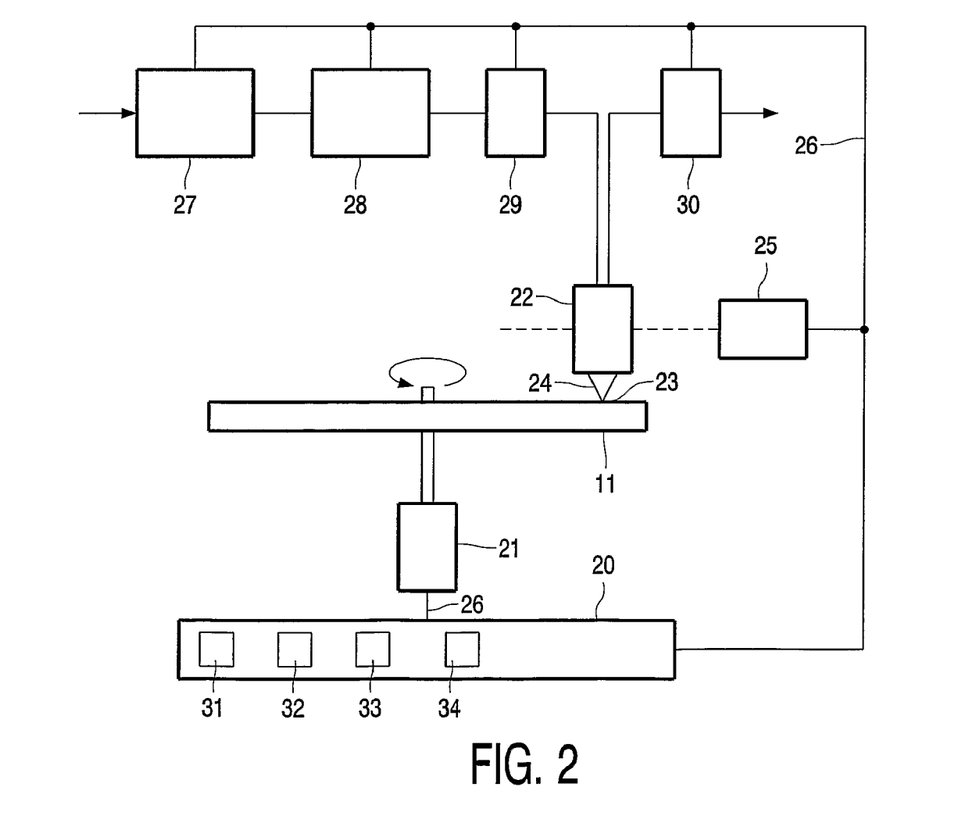
FIG. 2 shows a recording device having a real-time information defect management function.

FIG. 2 shows a recording device having a real-time information defect management function. The device is for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an (optional) input unit 27, and a formatter 28 and a modulator 29. During the writing operation, marks representing the information are formed on the record carrier. The marks are formed by means of the spot 23 generated on the recording layer via the beam 24 of electromagnetic radiation, usually from a laser diode. Digital data is stored on the record carrier according to a predefined data format. Writing and reading of information for recording on optical disks and formatting, error correcting and channel coding rules are well-known in the art, e.g. from the CD and DVD system.

The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

The formatter 28 is for adding control data and formatting and encoding the data according to the recording format, e.g. by adding error correction codes (ECC), interleaving and channel coding. Further the formatter 28 comprises synchronizing means for including synchronizing patterns in the modulated signal. The formatted units comprise address information and are written to corresponding addressable locations on the record carrier under the control of control unit 20. The formatted data from the output of the formatter 28 is passed to the modulator 29, which generates a laser power control signal which drives the radiation source in the optical head. The formatted units presented to the input of the modulation unit 29 comprise address information and are written to corresponding addressable locations on the record carrier under the control of control unit 20.

The control unit 20 is arranged for controlling the recording by locating each block at a physical address in the track, and for defect management as described below. The control unit includes the following cooperating units: an addressing unit 31, a defect management unit 32, a real-time storage unit 33, and a real-time retrieval unit 34, which units are for example implemented in firmware.

In an embodiment the recording device is a storage device only, e.g. an optical disc drive for use in a computer. The control unit 20 is arranged to communicate with a processing unit in the host computer system via a standardized interface. Digital data is interfaced to the formatter 28 and the read processing unit 30 directly.

In an embodiment the device is arranged as a stand alone unit, for example a video recording apparatus for consumer use. The control unit 20, or an additional host control unit included in the device, is arranged to be controlled directly by the user, and to perform the functions of the file management system. The device includes application data processing, e.g. audio and/or video processing circuits. User information is presented on the input unit 27, which may comprise compression means for input signals such as analog audio and/or video, or digital uncompressed audio/video. Suitable compression means are for example described for audio in WO 98/16014-A1, and for video in the MPEG2 standard. The input unit 27 processes the audio and/or video to units of information, which are passed to the formatter 28. The read processing unit 30 may comprise suitable audio and/or video decoding units.

A read device has the same elements as the recording device, except the specific recording elements, e.g. the read device does not have the input unit 27, the formatter 28 and the modulator 29, and the defect management unit 32 and the real-time storage unit 33.

The addressing unit 31 is for translating physical addresses into logical addresses and vice versa in dependence of remapping information. The logical addresses constitute a contiguous user data storage space to be used for storing sequences of information blocks, such as files under control of a file management system, for example UDF. The remapping unit 32 is for managing the remapping information relating to at least one remapping area, e.g. for creating, updating and storing suitable tables of remapping information. The remapping information is indicative for translating a logical address initially mapped to a physical address in the user data area to an alternate physical address, which alternate physical address may be located in a dedicated and separate spare area, or may be provided locally by adapting the mapping of higher logical addresses (usually called slipping).

Figure 3:
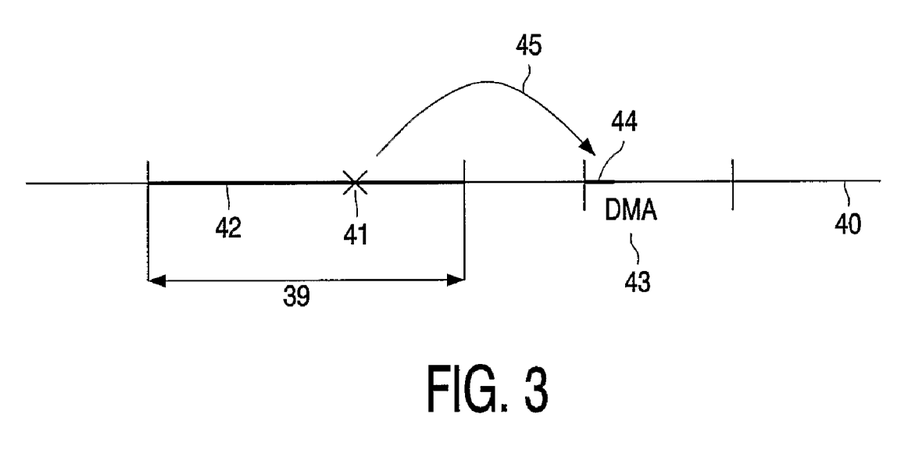
FIG. 3 shows remapping of defective locations.

FIG. 3 shows remapping of defective locations. A physical address space 40 is schematically represented by a horizontal line. A series of blocks 42 is to be recorded in an allocated physical address range 39. However a defect 41 interrupts the allocated physical address range. Remapping 45 is the process that a block 44 having a logical address corresponding to the physical address 41 that is defective is stored in an alternative physical address in a defect management area (DMA) 43. The remapping information provides data for translating the logical address initially mapped to a physical address exhibiting a defect to an alternate physical address in a defect management area, for example an entry in a secondary defect list including the logical address of the remapped block and its corresponding physical address. Alternatively remapping information may include data for translation of a physical address of a defect to a different physical address in a defect management area.

The defect management areas are located on the record carrier according to a recording area layout, and may be part of a system area assigned to system use. In the layout physical address are assigned a specific logical address of a user data area, or to a defect management area or system area, etc. The layout may be predefined, or may be defined according to parameters included in the system area. The defect management information may include assignment information indicative of assignment of physical addresses in first parts of the track to at least one user data area, assignment of physical addresses in second parts of the track to defect management areas, and assignment of the defect management information to the defect management areas. The assignment of the defect management information to the defect management areas indicates the use of the defect management area, for example a primary defect list and a secondary defect list, or replacement area for a specific type of defects.

Figure 4:
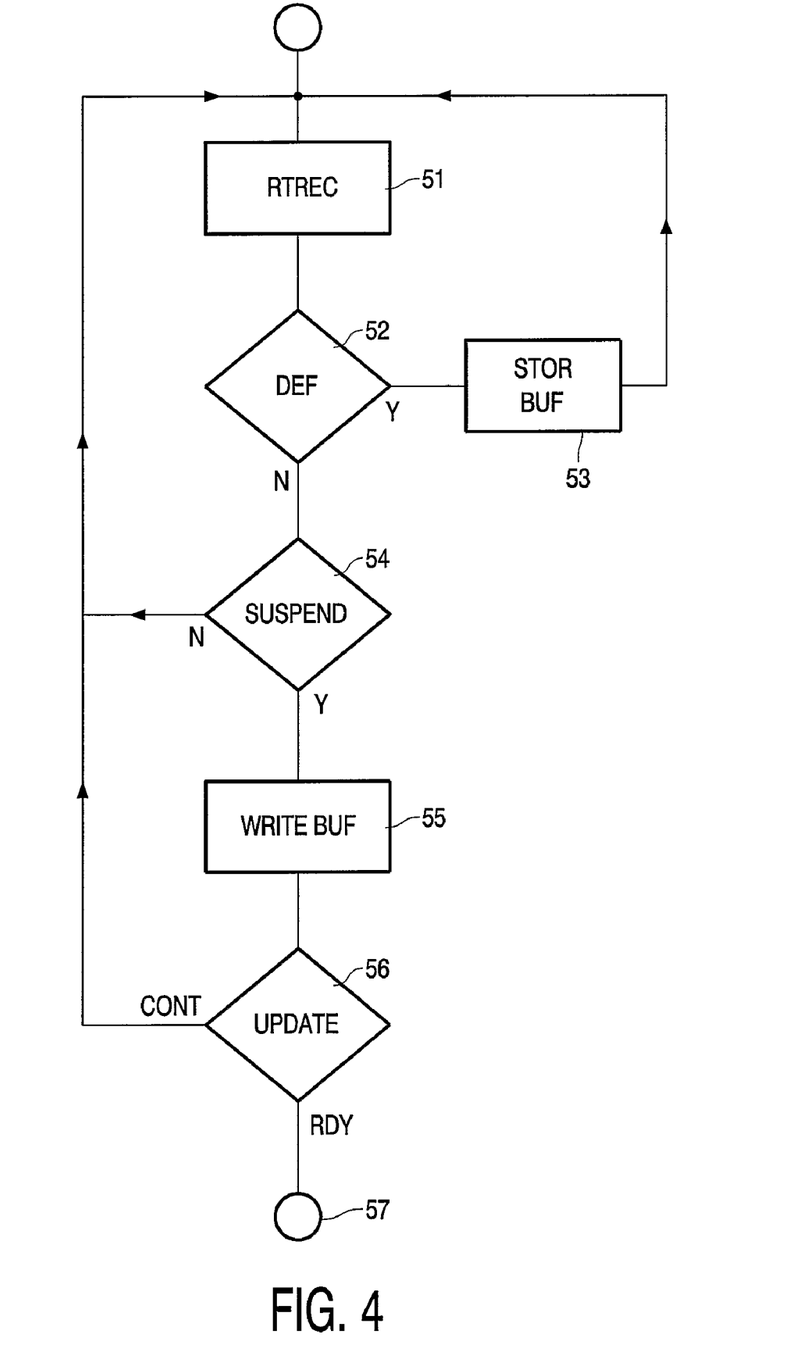
FIG. 4 shows a process of real-time information storage.

FIG. 4 shows a process of real-time information storage. The real-time storage unit 33 is for performing the process as follows. In a first step RTREC 51 real-time information blocks are written to respective initial physical addresses irrespective of the defective status. In a step DEF 52 it is detected whether the defect management information indicates that a physical address is defective. Note that the writing is nevertheless performed at that defective physical address. However in a step STOR BUF 53, when such writing at an indicated defective physical address occurs, the respective real-time information block that has been written on the physical address having the defective status is temporarily stored in a memory, e.g. a dedicated buffer or a part of a system memory. In a step SUSPEND 54 at a later time, a separate period is detected or actually enforced when the writing of real-time information blocks is suspended. In a step WRITE BUF 55, said temporarily stored real-time information blocks from the memory are additionally written to alternate physical addresses that may be allocated in a defect management area via the defect management unit 32. Subsequently the memory space is released again for further use. Finally in a step UPDATE 56 the defect management information is updated to a special status indicating that the real-time information block is present at the initial physical address having the defective status and at the alternate physical address. The process is continued at step RTREC 51 if more real-time information needs to be recorded, and is terminated at READY 57 otherwise.

Figure 5:
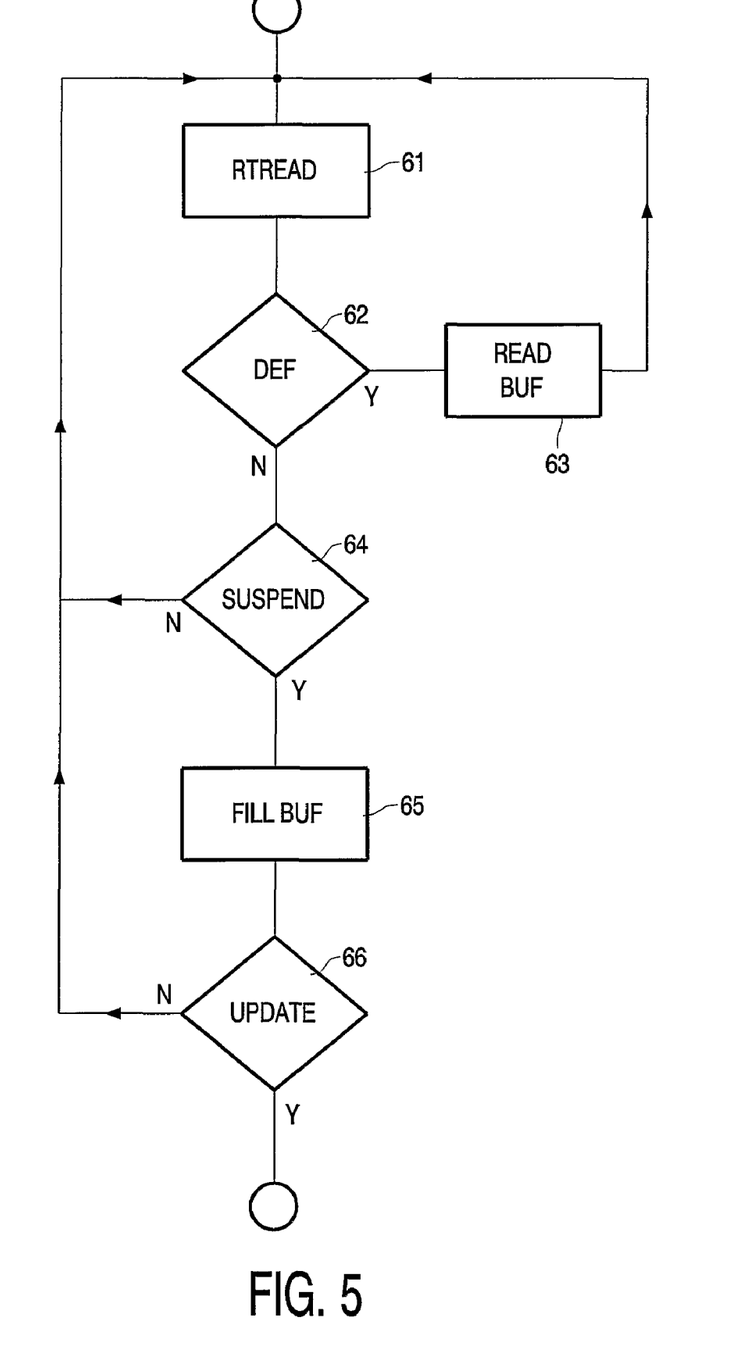
FIG. 5 shows a process of real-time information retrieval.

FIG. 5 shows a process of real-time information retrieval. In particular in the read device (and usually also in the recording device) the control unit includes the real-time retrieval unit 34 for performing the retrieval process as follows. In a step RTREAD 61 the real-time information blocks are read from the respective initial physical addresses irrespective of the defect management information, when real-time constraints do not allow suspending reading real-time information. However, in step DEFDUAL 62 it is detected if the defect management information indicates a dual status, i.e. that a physical address containing a real-time information block is defective but still has been recorded with the real-time information block, and also indicates that the real-time information block present at the initial physical address having the defective status is available at the alternate physical address. If so, the real-time information block is retrieved from a memory, e.g. a read buffer, in step READBUF 63, if previously stored therein. Hence the alternate real-time information block is outputted instead of information from the initial physical address having the defective status.

The memory is filled as follows. In a step SUSPEND 64 it is detected if the real-time information read process is or may be suspended, e.g. no pending read commands or when real-time constraints allow suspending reading of the real-time information. If so, in step FILLBUF 65, alternate real-time information blocks are read from alternate addresses according to the defect management information. Note that the step FILLBUF 65 may also be performed before starting the real-time information reading itself. At least the FILLBUF step includes reading the alternate locations of defective physical addresses in the area of the current reading command, but it may include reading beyond the current reading area, i.e. predicting future read commands, as long as real-time constraints allow interrupting or postponing the real-time information reading process. Finally in a step READY 66 it is detected if the real-time information reading process is complete, or has to be continued at step RTREAD 61.

In a practical embodiment the system for real-time write and read while applying real-time information defect management is as follows. Common defect management systems (like the Mount Rainier system for CD and DVD) are designed to provide an absolute secure medium in the sense that in case a location on disc is not completely trusted (e.g. due to a fingerprint or a scratch) it can be replaced towards the spare area. For PC data applications this is a crucial factor as it is of utmost importance that all data can be retrieved without errors. For real-time content such as streaming video (DVD video etc.) the time factor is more important. The fact that real-time information needs to be reproduced at a predefined speed requires that data is delivered to the respective decoders at high speed, which is commonly named real-time constraints. For example such constraints do not allow interruptions of the real-time information stream at random instants. It is for reproducing such real-time information that the real-time information defect management provides an advantage.

First a defect status is defined that provides a way to indicate that a replacement is also present at its original (possibly erroneous) location. Replacement entries in a defect table that are also present at their original location have the specific dual status, e.g. a status field set to a predefined value. This is the status that is used to indicate that data is recorded on two locations according to this invention.

Note that it is assumed that a drive is aware of the real-time nature of the data to be stored, e.g. by a specific user command, or based on analyzing the flow of data and commands that is exchanged with the host. Details of this drive ability are discussed later. First we have a look at how writing Real-time (RT) content towards the record carrier is handled. During writing RT content towards a rewritable disc the drive should do the following. First the drive tries to write all data towards the originally assigned locations. Secondly, if an error is detected in the write process the drive could decide to perform a retry. This decision can be based on the amount of time the drive assumes it has available to perform such a retry. Thirdly, the drive keeps the block that is written to the erroneous (or almost erroneous) location in its memory, and finally, when the drive has time (e.g. when the drive is in an idle state for a longer period of time) it writes all the blocks that it kept in memory towards the spare area. Note that the defect management information is to be updated to reflect the final state of recording.

In an embodiment the drive might decide to write the blocks temporarily stored in memory to the spare area if there is no (or almost no) memory left to store more of these blocks. At that moment the RT performance of the drive is reduced. In a further embodiment the drive might decide to stop storing real-time information blocks of defective locations in its memory. Another option is to use some algorithm to decide which blocks should be kept in memory and which blocks could be removed from memory. This algorithm could e.g. be based on the expected 'seriousness' of the error.

In an embodiment of the device the real-time storage unit 33 is arranged for discarding said temporarily stored real-time information blocks if the circumstances so require. For example when substantially no memory space is available for storing further real-time information blocks, and no interruptions of the real-time information stream may be allowed. In particular those stored real-time information blocks may selectively be discarded that have most likely been stored correctly at the initial physical address.

In a practical embodiment reading of real-time information stored as described above is performed as follows. A reading (and/or recording) device is reading RT content from a record carrier. Basically the drive always tries to read all data from the originally assigned locations. In addition defect management information regarding the area (to be) read is analyzed. If there are any replacements in the address range that is read, the drive analyses the type of replacements. For all replacements that have a dual storage status the drive tries to read the data from the original (non-replaced) location. For replacements with another status the drive can take a decision based on the amount of time the drive assumes it has available to read the replacement in the spare area or to leave it as it is (don't read the replacement, e.g. skip the physical address concerned) and continue after the replacement. Note that if real time constraints allow, alternate physical addresses may be read in advance or during interruptions of the reading process to be stored in the buffer memory, and are to be substituted for the (less reliable) data read from the original locations. In an embodiment the real-time retrieval unit 34 is arranged for said reading the alternate real-time information blocks before reading the real-time information blocks, and storing the alternate real-time information blocks in a buffer memory.

In an embodiment the drive gets a command to read a certain amount of data, and first the drive analyzes the defect management remapping tables indicating replacements to see which of the replacements have a dual status. For all replacements that don't have the special dual status the drive may decide to read the required replacements (within the area of data to be read) in advance (or during read accesses) and store them in the drive memory. As the unavoidable replacements are in the buffer memory, the drive now has the opportunity to fill in any replacements that don't have the dual status without the need to jump to the spare area and back for each single one of these replacements. If real-time constraints and buffer space allow, also further replacements that do have the dual status may be read and stored in the buffer.

In an embodiment the real-time storage unit is arranged for detecting real-time information from received write commands. A drive could analyze the incoming stream. If a drive receives read or write commands with more or less similar amounts of data at regular intervals in time that are retrieved from or written to consecutive addresses the drive could conclude that a RT file is read or written. Based on the intervals and the amount of data and the available buffer space (and other drive characteristics) the drive can make assumptions on the possibility to perform additional tasks, i.e. to suspend the reading to fill the buffer with future replacements, or to suspend the recording to store the data from the buffer respectively.

For example said detecting of real-time information may be performed by detecting recurring write commands for writing consecutive address ranges. Alternatively said detecting of real-time information may be deduced from a received streaming write command, in a particular case the streaming write command indicating that no defect management is to be performed.

In a practical embodiment the write commands are as follows. For the Mount Rainier standard for rewritable optical discs there are two read and two write commands of interest. These are the so-called Read10 and Read12 commands and the Write10 and Write12 commands. The Read10 and Write10 can be seen as the normal read and write commands. The Mount Rainier drive analyses the addresses given in these commands and applies the replacement defect management if applicable. The Read12 and Write12 (with the streaming flag set) are referred to as the Streaming-read and Streaming-write commands. These can be seen as 'physical read' and 'physical write'. The Mount Rainier drive doesn't apply any defect management and just returns all data it reads from the address range given in the command, without returning any defect flag when a defect is encountered on the disc.

In an embodiment of the device the real-time storage unit 33 is arranged for applying the real-time information defect management as follows. If the data is written to disc via Write12 commands the drive normally doesn't apply defect management. If the drive concludes that a RT file is written (as described above) the drive decides to perform the defect management in the background anyway. This could be done by monitoring the write process and storing data in the drive memory when the write process stores data at defective locations. In 'free' time or after the entire write process the drive could write the stored data towards the spare area. The defect management status should finally be set to a dual status indicating the storage of the real-time information block at the original and at the alternate location. If there is a shortage of spare locations the drive could decide to not perform this kind of defect management, or even to remove the spare locations that were generated earlier via real-time information defect management process.

In an embodiment of the device the real-time storage unit 33 is arranged for detecting real-time information from file system information. A convenient way to get information about the contents of a disc is via the File System information present on the disc. Typically this File System knowledge is not implemented in a drive, which means that the drive has to use other ways to get information to base various decisions on. However, a (limited) amount of file system knowledge may be included in the drive to allow the drive to decide if a file contains real-time information.

FIG. 6 shows real-time information defect management. A recording area 69 is schematically indicated by a horizontal line. A Lead-in area 70 is followed by a user data area 71 and terminated by a lead-out area 72. The lead-in 70 may contain a reserved area for defect management information 73, and the lead-out 72 may contain a spare area 74 for remapping. Note that in practice the location of the spare area 74 may be different, or several spare areas may be included. For example a inner spare area (ISA) may be located at an inner radial position immediately after the lead-in area, whereas an outer spare area (OSA) may be located at an outer radial position just before the lead-out area. In addition, on multilayer discs, each layer may have one or more spare areas. Note that the total amount of spare area may be a substantial part of the total data storage area of the record carrier, e.g. 50%, allowing managing a large amount of defects or overwrites, and via the current invention, control data or control data updates.

Figure 6A:
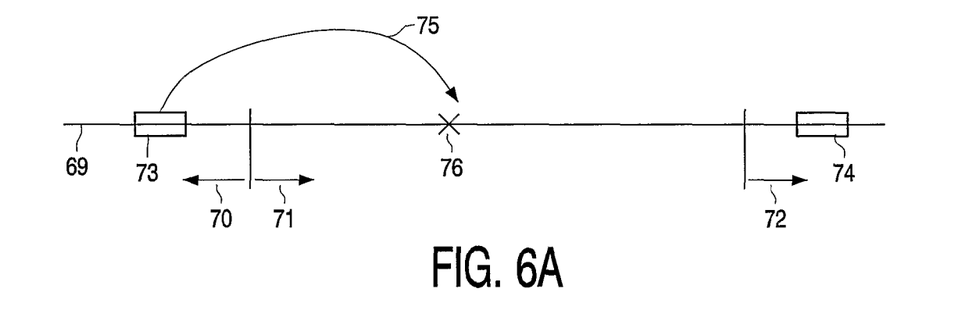
FIG. 6A shows a first situation before recording real-time information.
Figure 6B:
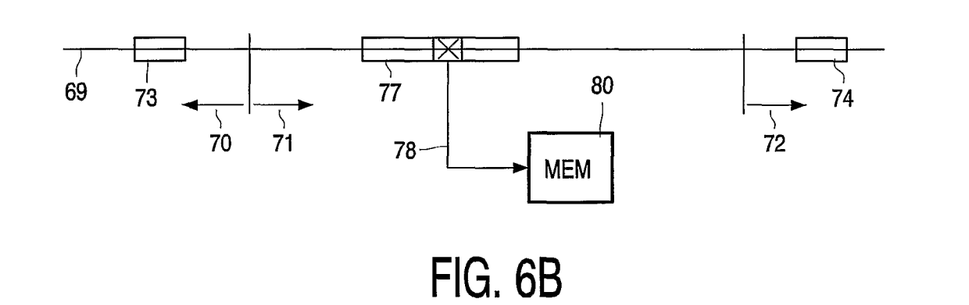
FIG. 6B shows a second situation after recording real-time information.
Figure 6C:
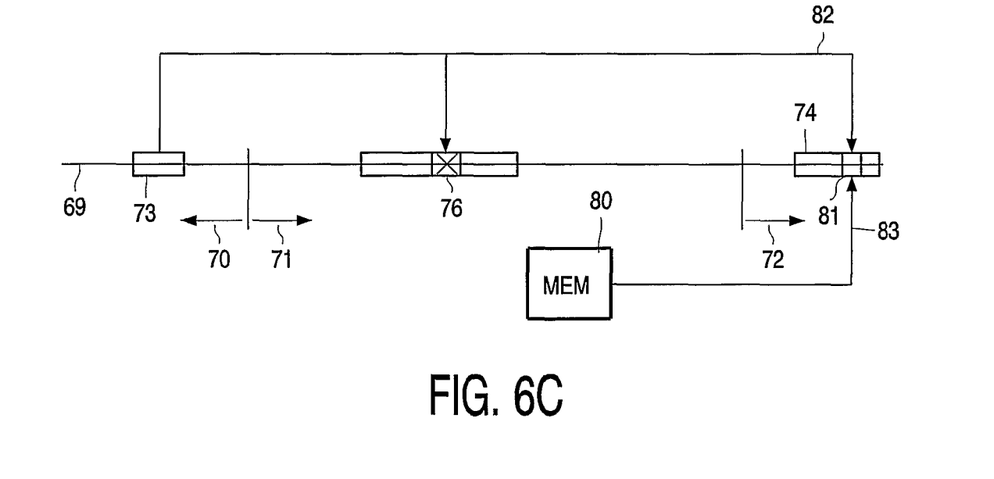
FIG. 6C shows a third situation after a period without real-time information recording.

FIG. 6A shows a first situation before recording real-time information. Defects 76 are known in the user data area as indicated in the defect management status information 75. FIG. 6B shows a second situation after recording real-time information 77. The real-time information recording process had real-time constraints. Hence real-time information blocks have been recorded at the defective locations 76, but have also been stored in the memory 80 as indicated by arrow 78. FIG. 6C shows a third situation after a period without real-time information recording, for example after suspending the real-time information recording process. The real-time information blocks from the memory 80 have been recorded at the alternate locations 81 in the spare area 74 as indicated by arrow 83. The defect management status information has been set to a dual status indicating that the real-time information blocks are present at the original locations 76 and the remapped locations 81 as indicated by the dual arrow 82.

It is noted that the function of the storage unit 33 and the retrieval unit 34 may alternatively be performed as a process of real-time information defect management in a separate device, for example as a computer program in a host computer controlling a disc drive. Then the drive accommodates physically recording and retrieving of information in blocks on the record carrier.

Although the invention has been explained mainly by embodiments using a DVD+RW or BD defect management system, similar defect management systems used for other types of record carriers are suitable for applying the invention. Also for the information carrier an optical disc has been described, but other media, such as a magnetic hard disc, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Device for recording information in blocks having logical addresses on a record carrier, which device comprises
    recording means (22) for recording marks in a track on the record carrier representing the information, and
    control means (20) for controlling the recording by locating each block at a physical address in the track, the control means comprising
    addressing means (31) for translating the logical addresses into the physical addresses and vice versa in dependence on defect management information,
    defect management means (32) for managing the defect management information, the defect management information comprising defect information on a defective status of physical addresses and remapping information on translating a logical address initially mapped to an initial physical address to an alternate physical address, and
    real-time storage means (33) for
    writing real-time information blocks to respective initial physical addresses irrespective of the defective status,
    and temporarily storing, in a memory, at least one real-time information block that has been written on a physical address having the defective status,
    and, in a separate period when the writing of real-time information blocks is suspended, additionally writing said temporarily stored real-time information block to the alternate physical address,
    and updating the defect management information to indicate that the real-time information block is present at the initial physical address having the defective status and at the alternate physical address, wherein the real-time storage means (33) are arranged for detecting real-time information from recurring write commands for writing consecutive address ranges.

2. Device as claimed in claim 1 wherein the real-time storage means (33) are arranged for said detecting of real-time information from a received streaming write command, in a particular case the streaming write command indicating that no defect management is to be performed.

3. Device as claimed in claim 1, wherein the real-time storage means (33) are arranged for detecting real-time information from file system information.

4. Device as claimed in claim 1, wherein the real-time storage means (33) are arranged for additionally writing said temporarily stored real-time information blocks when substantially no memory space is available for storing further real-time information blocks.

5. Device as claimed in claim 1, wherein the real-time storage means (33) are arranged for discarding said temporarily stored real-time information blocks, in a particular case when substantially no memory space is available for storing further real-time information blocks, or selectively discarding stored real-time information blocks that have most likely been stored correctly at the initial physical address.

6. Device for reading information in blocks having logical addresses on a record carrier, which device comprises
    reading means (30) for reading marks in a track on a record carrier representing the information,
    control means (20) for controlling the reading by locating each block at a physical address in the track, the control means comprising
    addressing means (31) for translating the logical addresses into the physical addresses and vice versa in dependence on defect management information, the defect management information comprising defect information on a defective status of physical addresses and remapping information on translating a logical address initially mapped to an initial physical address to an alternate physical address, and
    real-time retrieval means (34) for,
    when real-time constraints do not allow suspending reading real-time information, reading the real-time information blocks from the respective initial physical addresses irrespective of the defect management information,
    and, in a separate period when real-time constraints allow suspending reading real-time information, reading at least one alternate real-time information block from an alternate address according to the defect management information indicating that the real-time information block is present at the initial physical address having the defective status and at the alternate physical address, and outputting the alternate real-time information block instead of information from the initial physical address having the defective status, wherein the real-time retrieval means (34) are arranged for said reading the alternate real-time information blocks before reading the real-time information blocks, and storing the alternate real-time information blocks in a memory.

7. Method of real-time information defect management for use in recording information in blocks having logical addresses, which recording comprises
    locating each block at a physical address in a track on a record carrier,
    translating the logical addresses into the physical addresses and vice versa in dependence on defect management information,
    managing the defect management information, the defect management information comprising defect information on a defective status of physical addresses and remapping information on translating a logical address initially mapped to an initial physical address to an alternate physical address, wherein detecting defect real-time information from recurring write commands for writing consecutive address ranges;

which method comprises
  writing real-time information blocks to respective initial physical addresses irrespective of the defective status,
  and temporarily storing at least one real-time information block that has been written on a physical address having the defective status,
  and, in a separate period when the writing of real-time information blocks is suspended, additionally writing said temporarily stored real-time information block to the alternate physical address,
  and updating the defect management information to indicate that the real-time information block is present at the initial physical address having the defective status and at the alternate physical address.

* * * * *